United States Patent
Helm

[11] 3,856,194
[45] Dec. 24, 1974

[54] CAR TOP CARRIER ROOF OR DECK LID
[76] Inventor: Frederick A. Helm, 9818 Grinnell Ave., Detroit, Mich. 48213
[22] Filed: Dec. 26, 1973
[21] Appl. No.: 428,190

[52] U.S. Cl. ............ 224/42.1 D, 52/718, 248/345.1, 248/350, 293/1, 293/62
[51] Int. Cl. ............................................... B60n 9/04
[58] Field of Search ..... 224/42.1 D, 42.1 E, 42.1 R, 224/29 R; 248/205 A, 350, 345.1, 346; 293/1, 62, DIG. 4; 52/716, 717, 718

[56] References Cited
UNITED STATES PATENTS

| | | | |
|---|---|---|---|
| 3,197,935 | 8/1965 | Clancy et al. | 52/718 |
| 3,606,431 | 9/1971 | Kunevicius | 52/718 X |
| 3,615,069 | 10/1971 | Bott | 224/42.1 D X |

*Primary Examiner*—Robert J. Spar
*Assistant Examiner*—Jerold M. Forsberg
*Attorney, Agent, or Firm*—Barnes, Kisselle, Raisch & Choate

[57] ABSTRACT

A car top carrier roof or deck lid comprising a plurality of longitudinally extending metal strips adapted to extend along a car top. Each strip may be various forms of channel shaped metal comprising a base wall, spaced side walls and longitudinally extending portions extending inwardly toward one another. A plurality of plastic members are positioned at spaced points within said strip. Each plastic member comprises a relatively rigid central body having an exposed surface, relatively rigid side walls extending transversely from the central body and relatively rigid secondary walls extending from the side walls at a point spaced from the exposed surface and toward the exposed surface. The relatively rigid secondary walls are connected to the side walls by integral flexible portions. Each secondary side wall has a free edge with a shoulder thereon receiving the inwardly extending portions of the strip. A layer of pressure sensitive material is provided on the exposed surface so that when said plastic members are in position within said strip, the exposed surfaces extend outwardly beyond the adjacent edges of said inwardly extending portions of said strip and when the pressure sensitive surfaces are applied to a car top, the plastic members are adhered thereto holding the strip in position.

31 Claims, 9 Drawing Figures

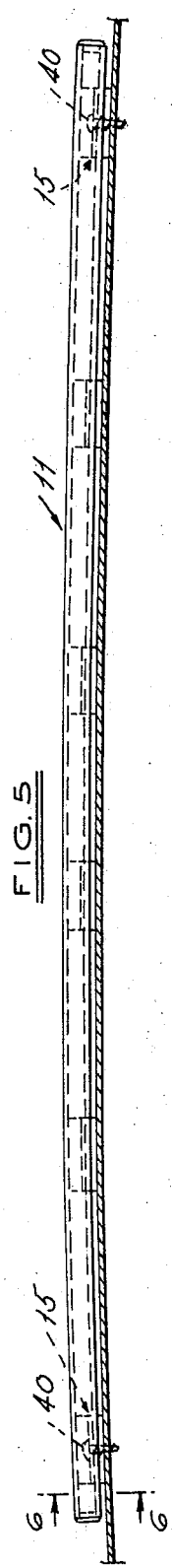
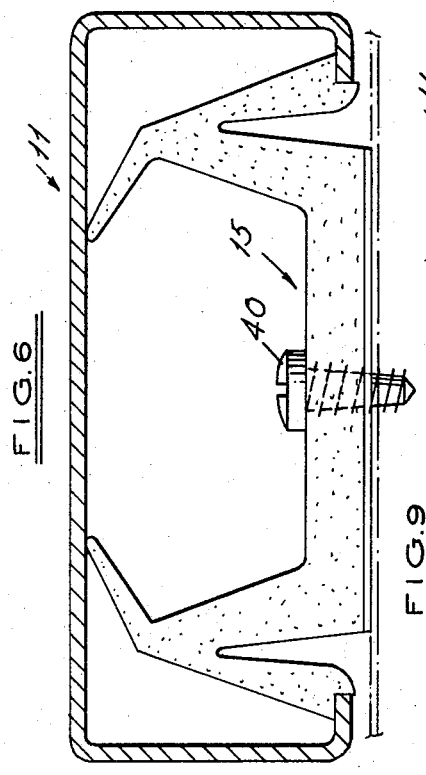
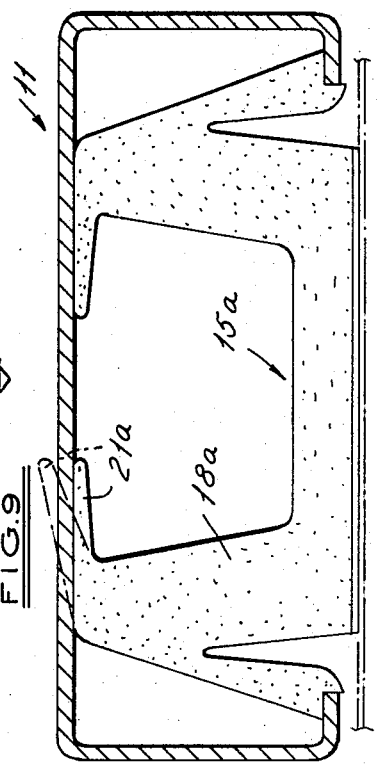
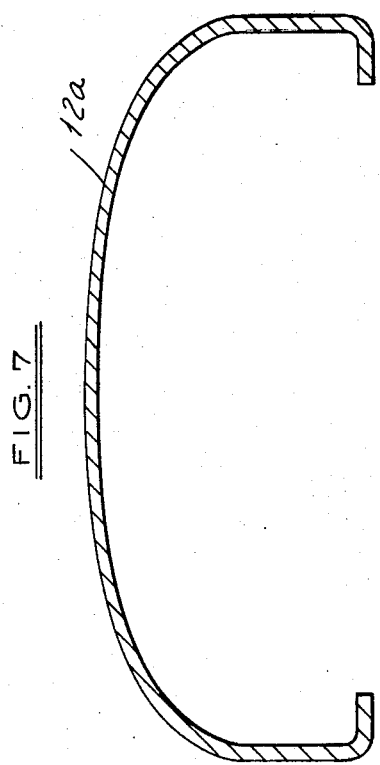
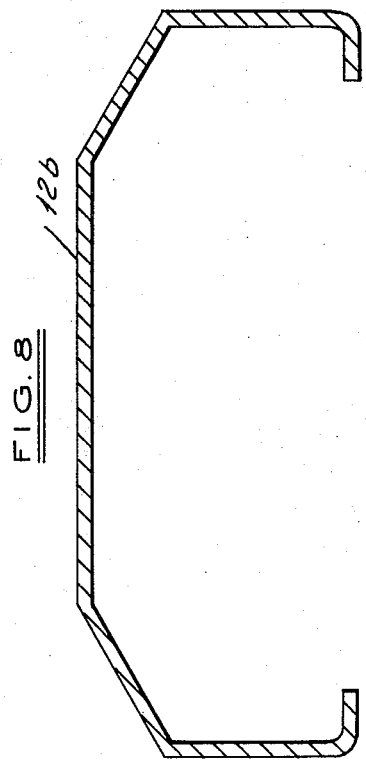

CAR TOP CARRIER ROOF OR DECK LID

This invention relates to car top roof or deck lid carriers and similar strips adapted to be mounted to surfaces.

BACKGROUND OF THE INVENTION

In car top carriers, it is common to provide a plurality of strips which are fixed to the car top and form a load bearing surface for supporting the load on the car top. The strips function to transfer the load and at the same time protect the car top and, in addition, provide an aesthetic effect.

It has been common to fasten such strips directly to the car top by screws or to portions of the carrier. It has also been suggested that the strips might be adhered to the car top.

Among the objects of the invention are to provide a construction whereby strips of metal or the like can be fastened to the car top without the use of screws; wherein the assembly of the fastening members is readily achieved without the use of tools and without injury to the worker; which is relatively low in cost and can be readily handled prior to application.

SUMMARY OF THE INVENTION

The car top carrier roof embodying the invention comprises a plurality of longitudinally extending strips adapted to extend along a car top roof, deck lid or body side molding. Each strip is channel shaped and comprises a base wall, spaced side walls and longitudinally extending portions extending inwardly toward one another. A plurality of plastic members are positioned at spaced points within said strip. Each plastic member comprises a relatively rigid central body having an exposed surface, relatively rigid side walls extending transversely from the central body and relatively rigid secondary walls extending from said side walls at a point spaced from the exposed surface and toward the exposed surface. The relatively rigid secondary walls are connected to the side walls by an integral flexible portion. Each secondary side wall has a free edge with a shoulder thereon receiving the inwardly extending portions of said strip. The plastic members have integral flexible portions extending from the side walls in a direction opposite from the central body portion. A layer of pressure sensitive material is provided on the exposed surface so that when the plastic members are in position within said strip, the exposed surfaces extend outwardly beyond the adjacent edges of said inwardly extending portions of said strip and when the pressure sensitive surfaces are applied to a car top, the plastic members are adhered thereto holding the strip in position.

DESCRIPTION OF THE DRAWINGS

FIG. 5 is a longitudinal view of a modified form of the invention.

FIG. 6 is a sectional view taken along the line 6—6 in FIG. 5.

FIGS. 7 and 8 are sectional views of modified forms of a part of the invention.

FIG. 9 is a sectional view similar to FIG. 2 of a modified form of the invention.

DESCRIPTION

Figure 1:
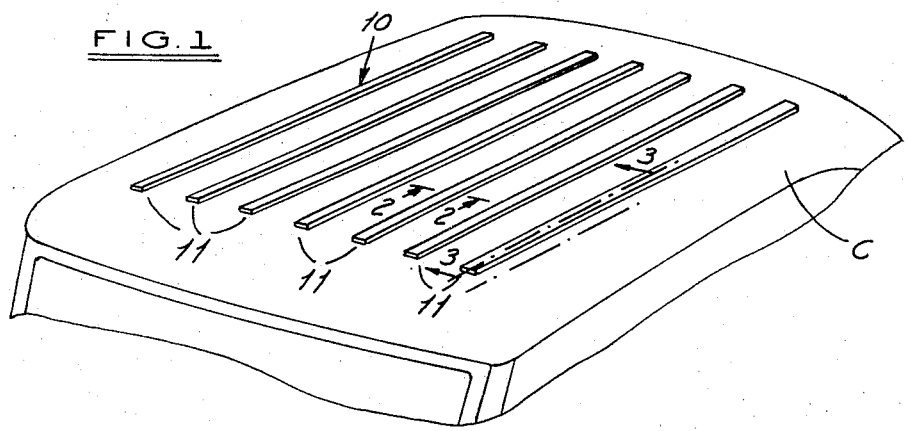
FIG. 1 is a fragmentary perspective view of a car top embodying the invention.

Referring to FIG. 1, the car top roof 10 comprises a plurality of strips 11 which are adapted to be applied to a car top C. Each strip 11 may be various forms of channel shaped metal and includes a base wall 12, side walls 13 and inwardly extending portions 14. Each strip 11 is preferably made of a spring material such as stainless steel such that the side walls 13 can spring outwardly, as presently described.

A plurality of plastic fastening members 15 are provided at longitudinally spaced points within each strip and comprise a central body portion 16 providing an exposed flat surface 17, integral side wall portions 18 extending from the edges of the central body portion 16. The body 15 is made of a plastic material which is relatively rigid in thick cross section and flexible in thin cross section such as acrylonitrile butadiene styrene. Secondary walls 19 are connected by flexible integral hinge portions 20 adjacent to the upper edges of the side walls 18 at a point spaced from the surface 17 and extend toward the surface. Flexible tapered spring portions 21 extend upwardly and inwardly from the upper edge of the side walls 18. Shoulders 22 are provided on the lower edges of the secondary walls 19 and include two angularly related surfaces 23, 24. The distance between the free edges 25 of the inwardly extending portions 14 of strip 11 is less than the distance between the surfaces 24 of the members 15 when the members are in the untensioned state. Similarly the distance between the exposed surface 23 and the free edge 26 of the spring portions is greater than the distance between the lower surface 27 and the inner surface 28 of the strip.

Figure 4:
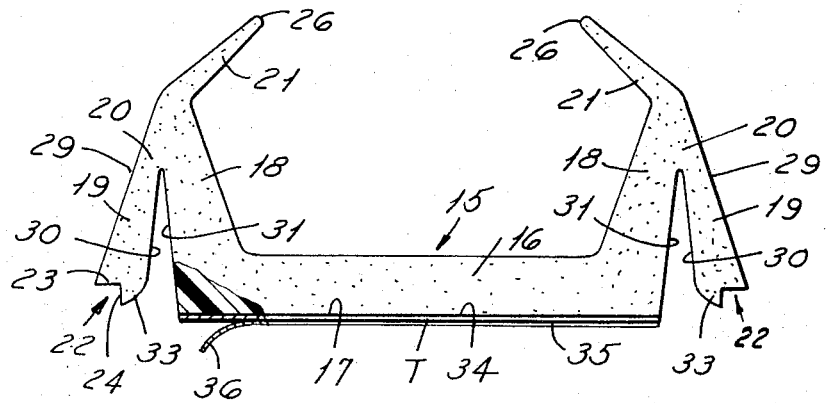
FIG. 4 is a view of a part of the invention prior to assembly.

The exposed or outer surfaces 29 of secondary walls 19 are substantially uniformly tapered or inclined inwardly and upwardly as viewed in FIG. 4 to form pilot or guide surfaces, as presently described.

Each member 15 can be applied by moving it transversely inwardly, the tapered surfaces 29 facilitating insertion of the plastic members by guiding the inward movement of the secondary walls 19 as they flex to permit the plastic members to be inserted. As shown in FIG. 4, the surfaces 30, 31 of the secondary walls 19 and side walls 18 which are adjacent to one another are straight. During the insertion the tapered surfaces 29 engage the edges of portions 14 of strip 11 and not only flex the secondary walls 19 but also flex the walls 13 of the strip 11 until the shoulders 22 engage the edges of the portions 14.

A pressure sensitive tape T is applied to the exposed surface 17 and comprises a pressure sensitive surface 34 adhering the tape to the surface 17 and an outer pressure sensitive surface 35 covered by a strippable backing or strip 36 which serves as a protective strip and can be peeled away when the strip is applied to the car top.

Figure 2:
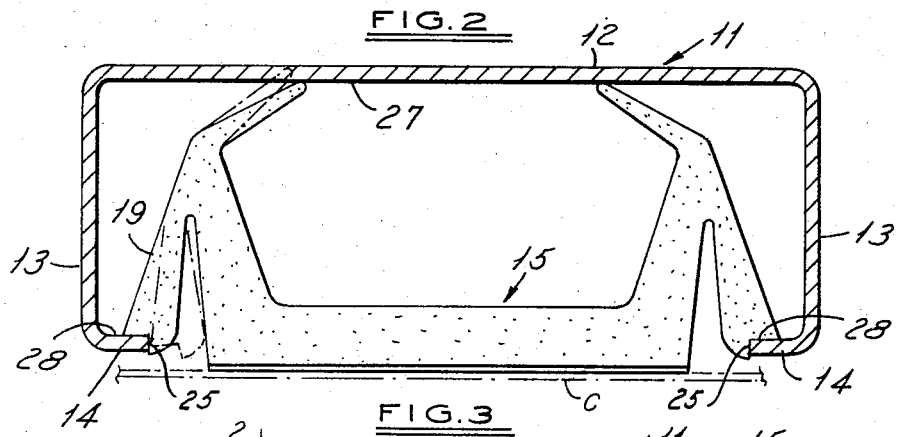
FIG. 2 is a fragmentary sectional view on an enlarged scale taken along the line 2—2 in FIG. 1.
Figure 3:
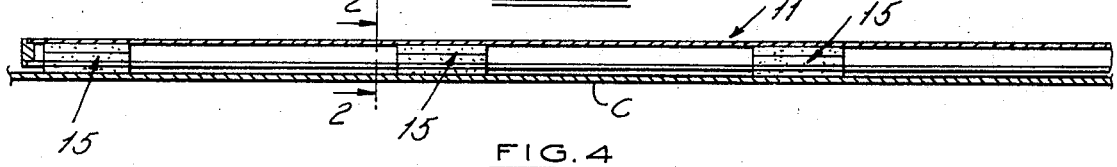
FIG. 3 is a longitudinally extending sectional view taken along line 3-3 through one of the strips of the roof shown in FIG. 1.

Prior to being applied to the car top, the surface 17 extends downwardly beyond the corresponding edge of the inwardly extending portions of the strip (FIG. 2).

When applied to the car top, the surface 17 normally holds the strip 11 away from the car top. However, if undistributed loads are applied to the strip, the inwardly extending portions may contact the car top.

Although the strips 11 have been shown as having a flat base 12, other configurations may be used such as curved base 12a in FIG. 7 or a stepped base 12b in FIG. 8. Where the load on the deck is expected to be excessive, the plastic member 15a shown in FIG. 9 may be used wherein the side walls 18a are thickened and lengthened so that the spring portions 21 will flex but the strip 11 will be held in position and not be permitted to contact the top.

Where the surface to which strip 11 is to be applied is curved longitudinally as shown in FIG. 5, screws or other fasteners such as rivets may be used through the endmost plastic members 15a to conform the strips to the configuration. Such an arrangement may also be used with a surface which is not smooth and wherein the pressure sensitive adhesive might not adhere adequately, such as a vinyl covered surface.

Although the invention has been described in connection with a car top carrier, it is also applicable to decks for trunk lids of vehicles or side molding strips of vehicles.

I claim:

1. In a car top carrier deck, the combination comprising a plurality of longitudinally extending strips adapted to extend along a car top, each said strip being channel shaped and comprising a base wall, spaced side walls and longitudinally extending portions extending inwardly toward one another, a plurality of plastic members positioned at spaced points within each said strip, each said plastic member comprising a relatively rigid central body having an exposed surface, relatively rigid side walls extending transversely from said central body, relatively rigid secondary walls extending from said side walls at a point spaced from the exposed surface and toward said exposed surface, each said relatively rigid secondary wall being connected to said side wall by an integral flexible portion, each said secondary side wall having a free edge with a shoulder thereon receiving the inwardly extending portions of said strip, the distance between the free edges of said inwardly extending portions of said strip being less than the distance between said shoulders when said secondary walls are in the unflexed position, said plastic members having integral flexible portions extending from said side walls in a direction opposite from the central body portion engaging the inside of the strip and biasing the strip upwardly, and urging the inwardly extending portions of the said strip against said shoulders of said secondary walls, the distance between said inwardly extending portions of said strip and the inner surface of the base wall of said strip being less than the distance between the shoulders and the free edges of said flexible portions when the plastic member is in the unflexed condition, and a layer of pressure sensitive material on said exposed surface, said exposed surface when said plastic members are in position within said strip extending outwardly beyond the adjacent edges of said inwardly extending portions of said strip such that when the pressure sensitive surface is applied to a car top, the plastic members are adhered thereto holding said strip in position.

2. The combination set forth in claim 1 wherein said side walls of said strips are such that they flex outwardly during insertion of said strip.

3. The combination set forth in claim 1 wherein said pressure sensitive surface is provided by a flexible tape having pressure sensitive adhesive on opposite sides thereof, one side being adhered to the exposed surface of said central body portion, and the other side facing outwardly to provide the adhesive to the car top.

4. The combination set forth in claim 3 including a cover sheet protecting said exposed pressure sensitive adhesive, said sheet being removable for application of the strip to the car top.

5. The combination set forth in claim 1 wherein each said secondary wall has an inclined outer surface extending inwardly of the central body from the free end thereof toward the integral hinge, said inclined surface adapted to engage the free edge of the inwardly extending portions of said strip to facilitate insertion of said members in said strip.

6. The combination set forth in claim 5 wherein said inclined surface is uniformly inclined throughout its length.

7. The combination set forth in claim 6 wherein said side walls of said strip are such that they flex outwardly during insertion of said strip.

8. The combination set forth in claim 7 wherein said shoulder comprises angularly related surfaces, said inwardly extending portions of said strip having complementary surfaces.

9. The combination set forth in claim 1 wherein said yieldable portions of said plastic member extend inwardly toward one another and comprise tapered portions such that the free ends thereof are more flexible than the ends near the side walls of the plastic members.

10. The combination set forth in claim 1 wherein said plastic members are made of acrylonitrile butadiene styrene.

11. The combination comprising a strip adapted to be attached to a surface, said strip being channel shaped and comprising a base wall, spaced side walls and longitudinally extending portions extending inwardly toward one another, a plurality of plastic members positioned at spaced points within said strip, each said plastic member comprising a relatively rigid central body having an exposed surface, relatively rigid side walls extending transversely from said central body, relatively rigid secondary walls extending from said side walls at a point spaced from the exposed surface and toward said exposed surface, each said relatively rigid secondary wall being connected to said side wall by an integral flexible portion, each said secondary side wall having a free edge with a shoulder thereon receiving the inwardly extending portions of said strip, the distance between the free edges of said inwardly extending portions of said strip being less than the distance between said shoulders when said secondary walls are in the unflexed position, said plastic members having integral flexible portions extending from said side walls in a direction opposite from the central body portion engaging the inside of the strip and biasing the strip upwardly, and urging the inwardly extending portions of the said strip against said shoulders of said secondary walls, the distance between said inwardly extending portions of said strip and the inner surface of the base wall of said strip being less than the distance between the shoulders and the free edges of said flexible portions when the plastic member is in the unflexed condition, and a layer of pressure sensitive material on said exposed surface, said exposed surface when said plastic members are in position within said strip extending outwardly beyond the adjacent edges of said inwardly extending portions of said strip such that when the pressure sensitive surface is applied to a surface, the plastic members are adhered thereto holding said strip in position.

12. The combination set forth in claim 11 including a removable cover sheet over said pressure sensitive material.

13. The combination set forth in claim 11 wherein said pressure sensitive surface is provided by a flexible tape having pressure sensitive adhesive on opposite sides thereof, one side being adhered to the exposed surface of said central body portion, and the other side facing outwardly to provide the adhesive to the surface.

14. The combination set forth in claim 13 including a cover sheet protecting said exposed pressure sensitive adhesive, said sheet being removable for application of the strip to the surface.

15. The combination set forth in claim 11 wherein each said secondary wall has an inclined outer surface extending inwardly of the central body from the free end thereof toward the integral hinge, said inclined surface adapted to engage the free edge of the inwardly extending portions of said strip to facilitate insertion of said members in said strip.

16. The combination set forth in claim 15 wherein said inclined surface is uniformly inclined throughout its length.

17. The combination set forth in claim 16 wherein said side walls of said strip are such that they flex outwardly during insertion of said strip.

18. The combination set forth in claim 17 wherein said shoulder comprises angularly related surfaces, said inwardly extending portions of said strip having complementary surfaces.

19. The combination set forth in claim 11 wherein said yieldable portions of said plastic member extend inwardly toward one another and comprise tapered portions such that the free ends thereof are more flexible than the ends near the side walls of the plastic members.

20. The combination set forth in claim 19 wherein said plastic members are made of acrylonitrile butadiene styrene.

21. For use in attaching a strip to a surface, plastic members adapted to be positioned at spaced points within said strip, said plastic member comprising a relatively rigid central body having an exposed surface, relatively rigid side walls extending transversely from said central body, relatively rigid secondary walls extending from said side walls at a point spaced from the exposed surface and toward said exposed surface, each said relatively rigid secondary wall being connected to said side wall by an integral flexible portion, each said secondary side wall having a free edge with a shoulder thereon adapted to receive inwardly extending portions of said strip, said plastic member having integral flexible portions extending from said side walls in a direction opposite from the central body portion engaging the inside of the strip and biasing the strip upwardly, and urging the inwardly extending portions of the said strip against said shoulders of said secondary walls, said exposed surface when said plastic members are in position within said strip adapted to extend outwardly beyond the adjacent edges of said inwardly extending portions of said strip such that when the surface is applied to a car surface, the plastic member is applied thereto holding said strip in position.

22. The combination set forth in claim 21 including a layer of pressure sensitive material on said exposed surface.

23. The combination set forth in claim 21 wherein said pressure sensitive surface is provided by a flexible tape having pressure sensitive adhesive on opposite sides thereof, one side being adhered to the exposed surface of said central body portion, and the other side facing outwardly to provide the adhesive to the car top.

24. The combination set forth in claim 23 including a cover sheet protecting said exposed pressure sensitive adhesive, said sheet being removable for application of the strip to the car top.

25. The combination set forth in claim 21 wherein each said secondary wall has an inclined outer surface extending inwardly of the central body from the free end thereof toward the integral hinge, said inclined surface adapted to engage the free edge of the inwardly extending portions of said strip to facilitate insertion of said members in said strip.

26. The combination set forth in claim 25 wherein said inclined surface is uniformly inclined throughout its length.

27. The combination set forth in claim 26 wherein said shoulder comprises angularly related surfaces, said inwardly extending portions of said strip having complementary surfaces.

28. The combination set forth in claim 27 wherein said yieldable portions of said plastic member extend inwardly toward one another and comprise tapered portions such that the free ends thereof are more flexible than the ends near the side walls of the plastic members.

29. The combination set forth in claim 28 wherein said plastic member is made of acrylonitrile butadiene styrene.

30. The combination set forth in claim 21 including fastener means associated with said plastic member and fastening said plastic member to a car surface.

31. In a car top carrier deck, the combination comprising a plurality of longitudinally extending strips adapted to extend along a car top, each said strip being channel shaped and comprising a base wall, spaced side walls and longitudinally extending portions extending inwardly toward one another, a plurality of plastic members positioned at spaced points within each said strip, each said plastic member comprising a relatively rigid central body having an exposed surface, relatively rigid side walls extending transversely from said central body, relatively rigid secondary walls extending from said side walls at a point spaced from the exposed surface and toward said exposed surface, each said relatively rigid secondary wall being connected to said side wall by an integral flexible portion, each said secondary side wall having a free edge with a shoulder thereon receiving the inwardly extending portions of said strip, the distance between the free edges of said inwardly extending portions of said strip being less than the distance between said shoulders when said secondary walls are in the unflexed position, said plastic members having integral flexible portions extending from said side walls in a direction opposite from the central body portion engaging the inside of the strip and biasing the strip upwardly, and urging the inwardly extending portions of the said strip against said shoulders of said secondary walls, the distance between said inwardly extending portions of said strip and the inner surface of the base wall of said strip being less than the distance between the shoulders and the free edges of said flexible portions when the plastic member is in the unflexed condition, and a layer of pressure sensitive material on said exposed surface, said exposed surface when said plastic members are in position within said strip extending outwardly beyond the adjacent edges of said inwardly extending portions of said strip such that when the pressure sensitive surface is applied to a car top, the plastic members are adhered thereto holding said strip in position, and fastener means extending through said endmost plastic members and fastening said plastic members to a car surface.

* * * * *